United States Patent
Tarrajat et al.

(10) Patent No.: US 12,023,531 B2
(45) Date of Patent: Jul. 2, 2024

(54) CONNECTOR, RELEASABLE CAMBIUM SAVER PROVIDED WITH ONE SUCH CONNECTOR AND METHOD FOR USE THEREOF

(71) Applicant: ZEDEL, Crolles (FR)

(72) Inventors: Jules Tarrajat, Crolles (FR); Benoît Vuillermoz, Saint Martin d'Heres (FR); Maurice Pilotte, Beauharnois (CA)

(73) Assignee: ZEDEL, Crolles (FR)

( * ) Notice: Subject to any disclaimer, the term of this patent is extended or adjusted under 35 U.S.C. 154(b) by 257 days.

(21) Appl. No.: 17/601,214

(22) PCT Filed: Apr. 3, 2020

(86) PCT No.: PCT/EP2020/059691
§ 371 (c)(1),
(2) Date: Oct. 4, 2021

(87) PCT Pub. No.: WO2020/201570
PCT Pub. Date: Oct. 8, 2020

(65) Prior Publication Data
US 2022/0176172 A1 Jun. 9, 2022

(30) Foreign Application Priority Data
Apr. 3, 2019 (FR) ...................................... 1903596

(51) Int. Cl.
*A62B 35/00* (2006.01)
*A63B 29/02* (2006.01)
*F16B 45/02* (2006.01)

(52) U.S. Cl.
CPC .......... *A62B 35/0068* (2013.01); *A63B 29/02* (2013.01); *F16B 45/021* (2021.05)

(58) Field of Classification Search
CPC ... A62B 35/0068; F16B 45/021; A63B 29/02; A63B 27/00
See application file for complete search history.

(56) References Cited

U.S. PATENT DOCUMENTS

| 5,704,668 A | * | 1/1998 | Ferrato | F16B 45/00 |
| | | | | 294/82.33 |
| D687,700 S | * | 8/2013 | Petzl | D8/360 |

(Continued)

FOREIGN PATENT DOCUMENTS

| DE | 10243435 A1 * | 5/2003 | ............... A62B 1/06 |
| DE | 102 20 758 A1 | 11/2003 | |

(Continued)

OTHER PUBLICATIONS

Climbing Technology RollnLock pulley sold on amazon, first available date: Jul. 11, 2013, https://www.amazon.com/Climbing-Technology-08-98162-RollnLock-Pulley/dp/B00CH3E5ZY (Year: 2013).*

(Continued)

*Primary Examiner* — Terrell L McKinnon
*Assistant Examiner* — Ding Y Tan
(74) *Attorney, Agent, or Firm* — Oliff PLC (57) ABSTRACT

A connector includes a first ring with a blocker collaborating with a rod. The rod is movable between a first position where the first ring is closed and a second position where the first ring is open. The blocker is movable between a first position collaborating with the rod to keep the first ring closed and a second position allowing opening of the first ring. A second ring includes a probe. The probe is connected to the blocker. When the distance between the probe and the sliding area is greater than a threshold value, the probe prevents opening of the first ring by the blocker. When the distance between the probe and the sliding area is smaller than the threshold (Continued)

value, the probe allows opening of the first ring by the blocker.

10 Claims, 6 Drawing Sheets

(56) References Cited

U.S. PATENT DOCUMENTS

| | | | | |
|---|---|---|---|---|
| D819,429 | S | * | 6/2018 | Newing .......................... D8/356 |
| D839,718 | S | * | 2/2019 | Petzl .............................. D8/356 |
| 2003/0196853 | A1 | * | 10/2003 | LeBeau .................... A62B 1/14 182/5 |
| 2006/0185934 | A1 | | 8/2006 | Hanson |
| 2014/0138191 | A1 | * | 5/2014 | Chabod .................... A62B 1/06 188/65.1 |
| 2015/0345539 | A1 | * | 12/2015 | Servais ................. F16B 45/021 24/599.1 |
| 2017/0189725 | A1 | * | 7/2017 | Malcolm ................ A63B 29/02 |

FOREIGN PATENT DOCUMENTS

| | | | | |
|---|---|---|---|---|
| FR | 3000898 | A1 | * 7/2014 | ............... A62B 1/14 |
| GB | 2 047 382 | A | 11/1980 | |
| GB | 2047382 | A | * 11/1980 | ............... B66C 1/36 |

OTHER PUBLICATIONS

Petzl pro Traxion pulley youtube video dated Sep. 17, 2018 by Blackbear Prepper, https://www.youtube.com/watch?v=zY2uqFjjWIw (Year: 2018).*
Petzl P51 pro Traxion progressive capture pulley youtube video dated Jul. 20, 2015 by GME Supply, https://www.youtube.com/watch?v=pbyXN15-Pj4 (Year: 2015).*
Petzl Pro Traxion technical notice No. P0045600B (Year: 2018).*
TreeStuffdotcom youtube video on rope logic adjustable friction saver dated Sep. 4, 2018, https://www.youtube.com/watch?v=kW-v0_wV3WE (Year: 2018).*
Climbing arborist youtube video titled "How to install/retrieve a friction saver with a throwline" dated May 20, 2012, https://www.youtube.com/watch?v=sKEfLm066-4 (Year: 2012).*
Jul. 8, 2020 Search Report issued in International Patent Application No. PCT/EP2020/059691.

\* cited by examiner

CONNECTOR, RELEASABLE CAMBIUM SAVER PROVIDED WITH ONE SUCH CONNECTOR AND METHOD FOR USE THEREOF

BACKGROUND OF THE INVENTION

The invention relates to an openable connector, a releasable cambium saver and a hoisting device for hoisting on a wire part provided with one such connector, as well as to a method for using the releasable cambium saver.

PRIOR ART

In the field of tree care, it is known to use a cambium saver that defines a temporary anchoring system. The cambium saver is formed by a strap that encircles a branch or the trunk of a tree. The cambium saver has a strap provided with opposite first and second ends and a central ring. The central ring collaborates with a first end so that the first end passes through the ring of the strap to form a sliding loop that encircles a branch or the trunk of the tree. The first end acts as anchor point for the climber. The climber applies a force on the first end which clamps the branch of the tree firmly by closing the sliding loop. The first end of the strap is associated with a first metal ring and the second end is associated with a second metal ring having an inner dimension that is smaller than that of the first metal ring.

The climber installs his work rope in the first and second metal rings which are attached to the branch of the tree to form an anchor point.

Once the tree care work has been completed, the strap forming the cambium saver has to be retrieved.

To retrieve the cambium saver, the retrieval ball is fixed to the work rope and the work rope is then pulled to extract the work rope from the two metal rings. The retrieval ball passes through the first metal ring and remains stuck in the second metal ring so that the tractive force applied on the rope pulls on the second end of the strap and opens the sliding loop.

Once the strap loop has opened, the strap can be made to drop from the tree by pulling on the work rope fixed to the strap by the retrieval ball.

It is apparent that this solution is not satisfactory in use as it is quite common for the cambium saver to remain stuck, in particular in the tree. This results in particular from all the frictions that exist between the tree, the strap and the work rope. A requirement exists to reduce the risk of the cambium saver remaining stuck in the tree so as to facilitate retrieval of the device forming the cambium saver.

OBJECT OF THE INVENTION

The object of the invention is to remedy these shortcomings, and in particular to propose an openable connector opening of which is enabled when the end of the work rope is detected.

According to the invention, this object is achieved by a connector comprising:
- a first ring fitted in openable manner and provided with a blocker collaborating with a rod, the rod being fitted movable between a first position of the rod where the first ring is closed and a second position of the rod where the first ring is open, the blocker being fitted movable between a first position of the blocker collaborating with the rod in the first position of the rod to keep the first ring closed and a second position of the blocker allowing opening of the first ring;
- a second ring distinct from the first ring, the second ring having a variable cross-section by means of a probe, the probe being fitted movable with respect to a sliding area of the second ring;

connector wherein the probe is connected to the blocker so that when the distance between the probe and the sliding area is greater than a threshold value, the probe keeps the blocker in the first position of the blocker, and when the distance between the probe and the sliding area is lower than a threshold value, the probe allows movement of the blocker to the second position of the blocker.

Preferentially, a spring is configured to move the probe to the sliding area.

According to a development of the invention, the rod is movable in rotation between the first position of the rod and the second position of the rod.

In advantageous manner, the probe is movable in translation in a first direction beyond the threshold distance and movable in translation in a second direction secant to the first direction at the threshold distance. Translation of the probe in the second direction causes movement of the blocker between the first and the second position of the blocker.

In advantageous manner, the sliding area is formed by a pulley.

Preferentially, the connector comprises an additional wire part having a first end fixed to a body provided with the openable first ring and with the distinct second ring, the additional wire part having a second end fixed to the openable first ring.

It is a further object of the invention to provide a cambium saver comprising a connector according to one of the foregoing embodiments and advantageously comprising a blocking device configured for two strands of the additional wire part to define a ring of an additional wire part.

It is yet a further object of the invention to provide a hoisting device for hoisting on a wire part comprising a cambium saver according to the foregoing configuration and a wire part associated with a retrieval ball, the wire part passing through the second ring, the wire part having a larger lateral dimension than the threshold distance, the retrieval ball having a larger lateral dimension than the threshold distance and the retrieval ball being separated from the wire part by a second wire part having a smaller lateral dimension than the threshold distance.

It is a further object of the invention to provide a method for using a hoisting device for hoisting a wire part.

According to the invention, this object is achieved by a method for using a hoisting device on a wire part successively comprising the following steps:
- providing a hoisting device for hoisting a wire part according to the foregoing configuration;
- moving the wire part into the second ring so that the probe leaves the wire part and moves to the second wire part and that the blocker allows opening of the openable first ring.

In one development, the wire part is associated with a retrieval ball. A force applied on the wire part to extract the wire part from the connector results in the retrieval ball being brought into contact with the probe and movement of the probe to the rear of the connector to open the first ring.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

To perform tree care work, it is advantageous to have a hoisting device for hoisting a wire part that has an anchor point on the tree to be pruned or on a nearby tree. In order not to damage the tree on account of the anchor point, it is advantageous to use a strap or a rope defining a cambium saver. The strap/rope passes round a branch or the trunk of the tree to form the anchor point for the wire part which will be used for the tree care operations.

Use of a cambium saver is known from the prior art. The cambium saver is formed by a strap associated at its two opposite ends with two metal rings having different dimensions so that only one of these rings can operate in conjunction with a retrieval ball to block the latter. Such a configuration is however not practical to use as the frictions that exist between the tree, the ropes and the strap forming the anchor point mean that the cambium saver often remains stuck in the tree on completion of the tree care operation.

A different configuration of a cambium saver having an openable connector is therefore proposed. A large number of different configurations of openable connectors exist such as carabiners or quick links, but it is necessary to be in direct contact with the connector to be able to open the latter, which is impossible in the configuration of the cambium saver for tree care.

Figure 1:
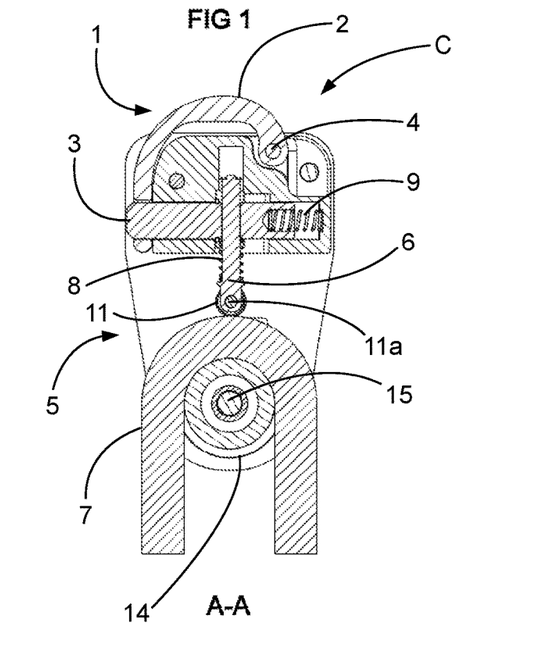
FIG. 1 illustrates a connector provided with a wire part in the second ring, in schematic manner, in cross-section in the plane AA of FIG. 2.
Figure 2:
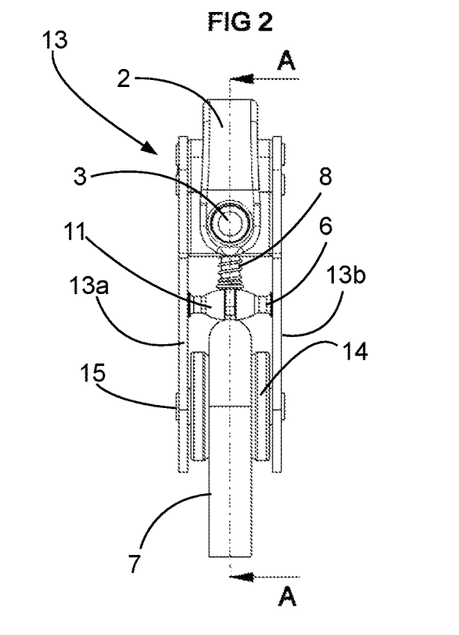
FIG. 2 illustrates a connector provided with a wire part in the second ring, in schematic manner, in side view.
Figure 3:
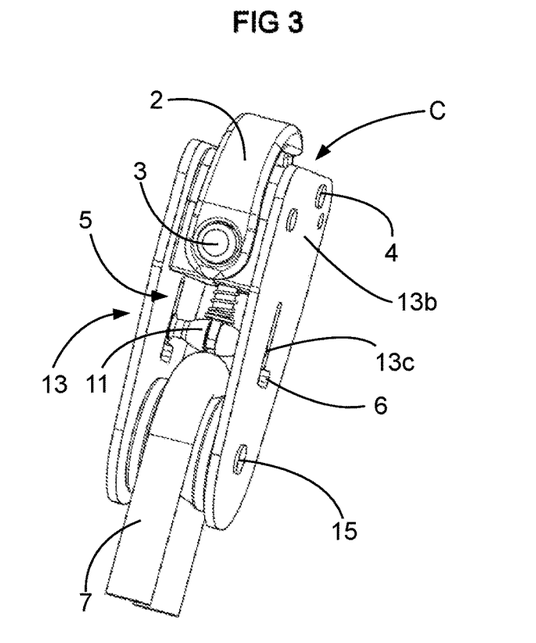
FIG. 3 illustrates a connector provided with a wire part in the second ring, in schematic manner, in profile view.
Figure 10:
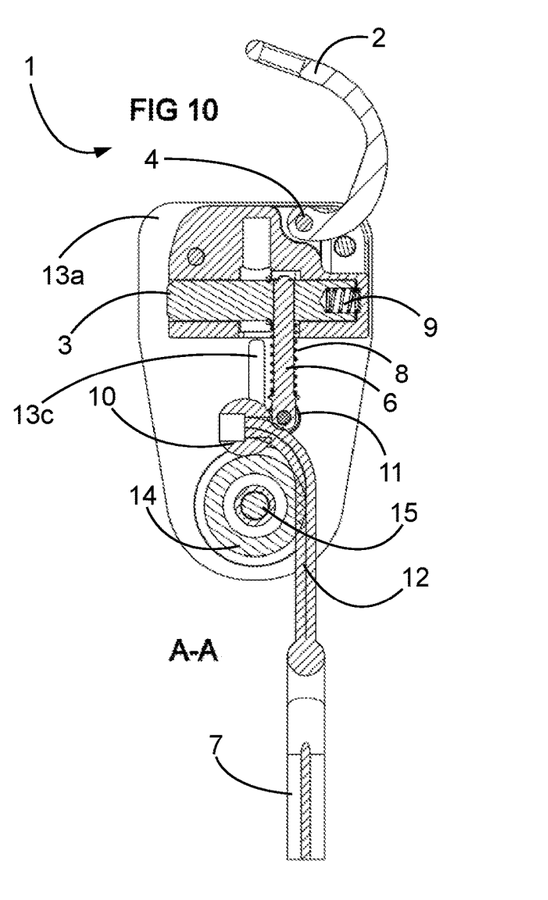
FIG. 10 illustrates a connector provided with a retrieval ball pressing on a probe, in schematic manner, in cross-section.

The connector according to the invention is an openable connector defining two distinct rings. An embodiment of a connector is illustrated in FIGS. 1 to 12 in different states. The connector defines a first ring 1 which is an openable first ring. First ring 1 is partially formed by a rod 2 (arm) that operates in conjunction with a blocker 3. That is, the rod 2 and body 13 delineate the first ring 1. Rod 2 is fitted movable between a first position of rod 2 where first ring 1 is closed (i.e., the rod 2 and the body 13 define a closed through hole as illustrated by FIG. 1) and a second position of rod 2 where first ring 1 is open (i.e., the rod 2 is moved relative to the body 13 such that the through hole is opened as illustrated by FIG. 10). Movement of rod 2 between its first and second positions defines the two opposite states of openable first ring 1.

Depending on the configurations, rod 2 is fitted movable in rotation, in translation or with another movement able for example to combine a translation and a rotation. In the embodiment illustrated in FIGS. 1 to 12, rod 2 is fitted movable around a spindle 4.

Blocker 3 is fitted movable between a first position of the blocker and a second position of the blocker. In the first position of the blocker, blocker 3 collaborates with rod 2 which is in the first position of rod 2 to keep first ring 1 closed. For example, rod 2 defines a blind or through cavity collaborating with blocker 3 to prevent rod 2 from moving out of the first position of rod 2 in which openable first ring 1 is closed. As an alternative, blocker 3 defines a cavity collaborating with a salient part of rod 2 to prevent opening of openable first ring 1.

In the second position of blocker 3, blocker 3 allows opening of openable first ring 1. Advantageously, in the second position of blocker 3, rod 2 is not in direct mechanical contact with blocker 3.

It is particularly advantageous to provide for opening of first ring 1 to take place by rotation of rod 2. When openable first ring 1 is under load, opening of openable first ring 1 is easier and the deformation of rod 2 is reduced in comparison with a configuration with a rod 2 movable in translation. Opening of the ring is also easier. When translation of rod 2 opens first ring 1, it is advantageous to have a connector the weight of which is unbalanced to drive the connector in rotation and release the additional wire part held in first ring 1.

The connector has a second ring 5 distinct from first ring 1. Second ring 5 has a variable cross-section on account of a probe 6. Second ring 5 has a sliding area designed to receive a wire part 7 supporting the climber in his/her tree care operations. Probe 6 is fitted movable with respect to the sliding area. Probe 6 moves so that the distance between probe 6 and the sliding area is able to be adjusted. In operation, wire part 7 presses on the sliding area of second ring 5.

Probe 6 is configured to compare the lateral dimension of wire part 7 which is in second ring 5 with respect to a threshold value which is a threshold separating distance between probe 6 and the sliding area. In a first configuration illustrated in FIGS. 1 to 12, probe 6 is associated with a spring 8 configured to move probe 6 to the sliding area and therefore to define a minimum distance between probe 6 and the sliding area. In another configuration which can be combined with the previous embodiment, probe 6 has a sufficient weight for probe 6 to be moved back to the sliding area by the effect of gravity.

Probe 6 is connected to blocker 3 so that when the distance between probe 6 and the sliding area is greater than a threshold value, probe 6 keeps blocker 3 in the first position of blocker 3. When the distance between probe 6 and the sliding area is lower than the threshold value, probe 6 allows movement of blocker 3 to the second position of blocker 3. The threshold distance corresponds to a threshold position of probe 6 with respect to the sliding area. This configuration enhances the safety level of the connector. In other words, so long as probe 6 is beyond the threshold value, probe 6 prevents blocker 3 from leaving the first position.

As illustrated in FIG. 1, in a particular embodiment probe 6 moves in translation and seeks to move to the sliding area. When a wire part 7 having a larger dimension than the threshold value is present in second ring 5, the wire part 7 moves probe 6 beyond the threshold position. A part of probe 6 engages in a cavity of the connector preventing movement of blocker 3. As an alternative, it is possible to provide for probe 6 to move only in translation and to be inserted in a cavity of blocker 3 to prevent it from moving to the second position. Other configurations are possible for the position of probe 6 to prevent or allow movement of blocker 3. Probe 6 is arranged to measure the lateral dimension of wire part 7.

The connector is designed to operate in collaboration with a wire part 7 having a larger lateral dimension than the threshold value. Wire part 7 is for example a rope having a minimum diameter or a strap having a minimum thickness larger than the threshold value. In this way, so long as wire part 7 is located in second ring 5, probe 6 is beyond the threshold position and blocker 3 is in the first position keeping first ring 1 in the closed position when rod 2 is in the first position of rod 2. In other words, so long as wire part 7 is present in second ring 5, first ring 1 cannot be opened.

In a particular configuration that is not illustrated, when wire part 7 leaves second ring 5 or when the lateral dimension of wire part 7 becomes smaller than the threshold value, probe 6 moves below the threshold position moving blocker 3 and enabling openable first ring 1 to be opened. For example, with a first ring 1 that is openable by rotation, when wire part 7 leaves second ring 5, the weight of the connector may be sufficient to trigger opening of first ring 1 thereby detaching the connector from its anchor point. It is advantageous to provide for wire part 7 to have a first cross-section larger than the threshold value and a second cross-section smaller than the threshold value so as to obtain opening of openable first ring 1 while keeping a mechanical contact between wire part 7 and the connector to be able to pull on the connector by means of wire part 7 when the connector remains stuck.

Blocker 3 can move in rotation, in translation or with any other movement between the first position of blocker 3 and the second position of blocker 3.

In order to improve operation of the connector, it is particularly advantageous to provide for movement of blocker 3 from the first position of the blocker to the second position of the blocker to be dissociated from movement of probe 6 from a position beyond the threshold position to the threshold position. In other words, when probe 6 reaches the threshold position, opening of first ring 1 is possible but is not automatic. In advantageous manner, blocker 3 is associated with a spring 9 keeping blocker 3 in the first position blocking first ring 1 in the closed position.

It is particularly advantageous to provide for movement of wire part 7 or of a retrieval ball 10 associated with wire part 7 to make blocker 3 move once probe 6 has reached the threshold position. In other words, once probe 6 has reached the threshold position, an additional action has to be performed to make of blocker 3 move and first ring 1 open.

Figure 11:
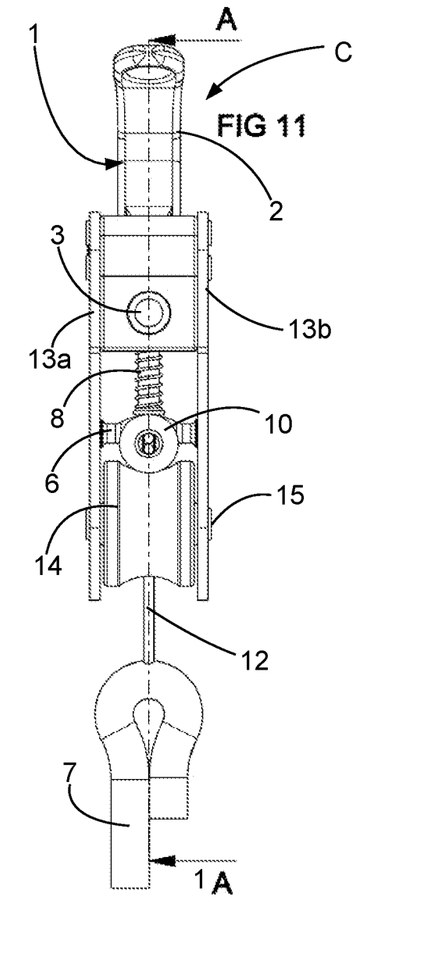
FIG. 11 illustrates a connector provided with a retrieval ball pressing on a probe, in schematic manner, in side view.
Figure 12:
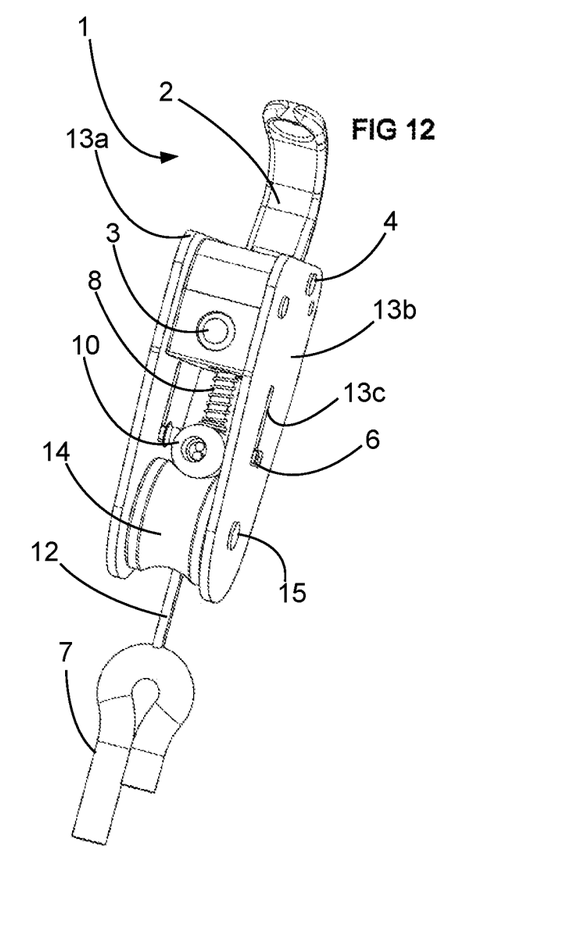
FIG. 12 illustrates a connector provided with a retrieval ball pressing on a probe, in schematic manner, in profile view.

In a preferential embodiment illustrated in FIGS. 10 to 12, once probe 6 has reached the threshold position, probe 6 having moved in a first direction, it is advantageous to move probe 6 in a second direction secant to the first direction.

Movement of the wire part causes in movement of probe 6 and movement of blocker 3 to achieve opening of first ring 1.

Probe 6 can be configured to have a rotating part 11 that becomes fixed when the threshold position is reached. Rotating part 11 can have spikes that come into contact with the wire part. When rotating part 11 can no longer rotate on itself, movement of the wire part causes movement of probe 6 causing movement of blocker 3 and opening of first ring 1. Rotating part 11 can be fitted on a spindle 11*a* that has a cross-section that is not circular and that slides in two grooves having different dimensions. The first groove corresponds to the first direction and is broader than the second groove which corresponds to the second direction of movement of probe 6. The first groove allows rotation of the spindle and of rotating part 11 whereas the second groove prevents this rotation. In this configuration, it is particularly advantageous to use a spring 8 that moves probe 6 to the sliding area to improve the contact between rotating part 11 and wire part 7.

In all cases, it is advantageous to have a probe 6 with a rotating part to reduce the friction of wire part 7 in second ring 5.

As an alternative, when probe 6 reaches the threshold position it releases an attachment part different from probe 6. The attachment part comes into contact with the wire part. Movement of the wire part on the sliding area causes movement of the attachment part resulting in movement of blocker 3 and opening of first ring 1. This configuration is less advantageous than the previous configuration as the attachment part is not formed by probe 6 which means that an additional part has to be fitted in the connector.

Figure 4:
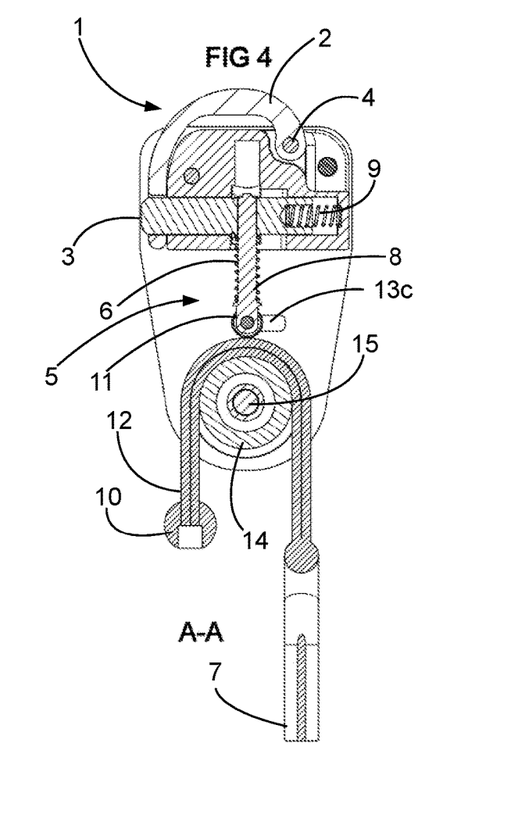
FIG. 4 illustrates a connector provided with an additional wire part in the second ring, in schematic manner, in cross-section in the plane AA of FIG. 5.
Figure 5:
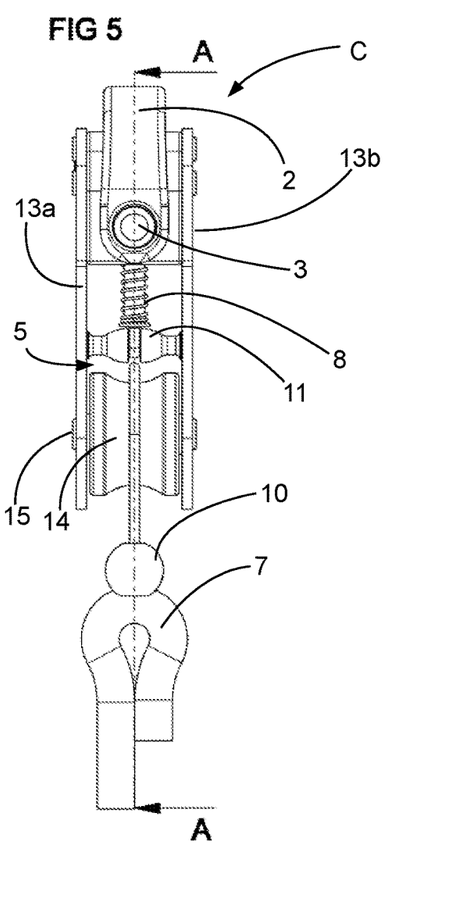
FIG. 5 illustrates a connector provided with an additional wire part in the second ring, in schematic manner, in side view.
Figure 6:
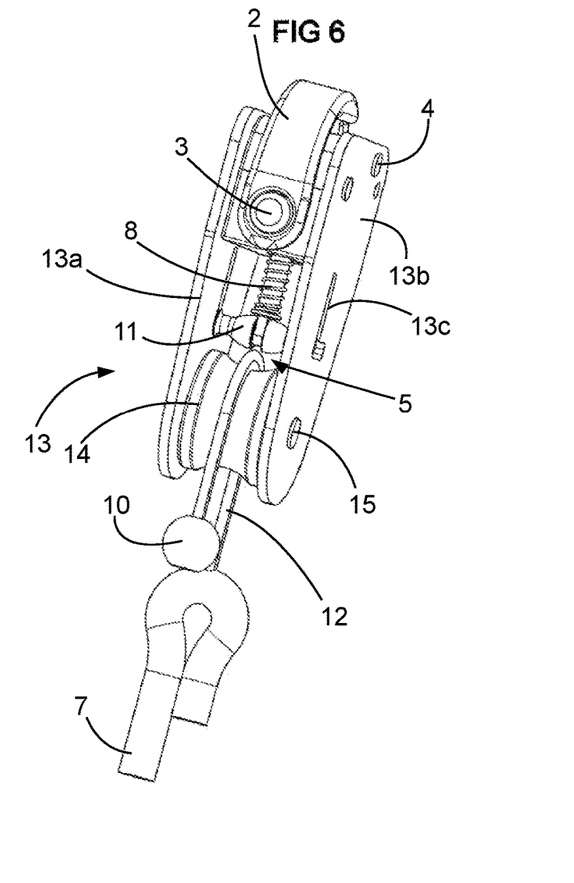
FIG. 6 illustrates a connector provided with a wire part in the second ring, in schematic manner, in profile view.
Figure 7:
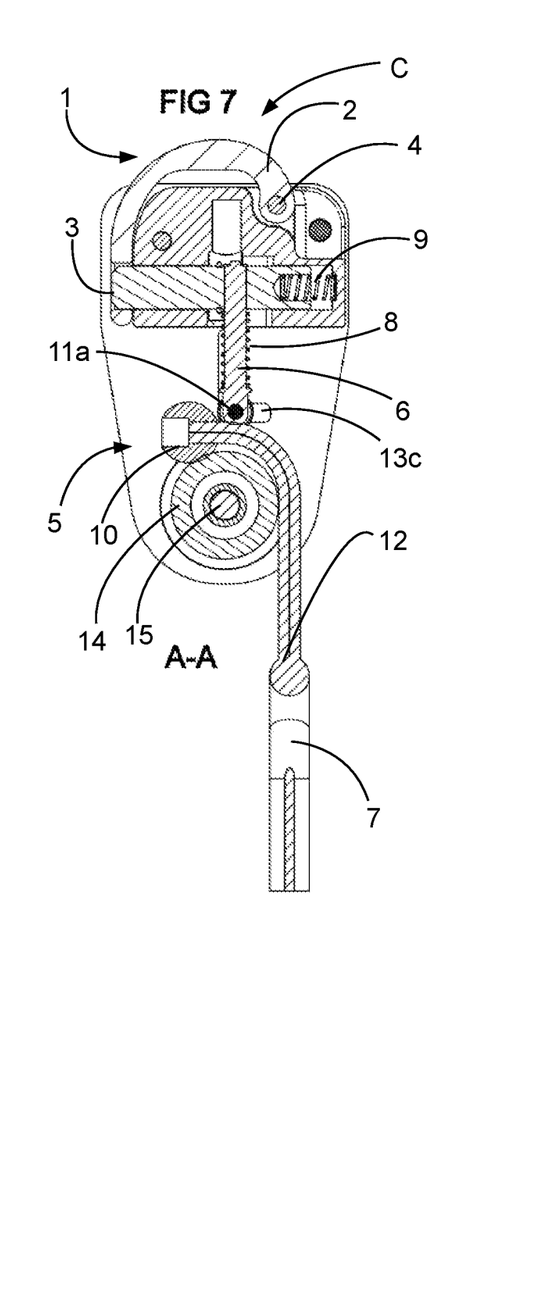
FIG. 7 illustrates a connector provided with a retrieval ball in the second ring, in schematic manner, in cross-section in the plane AA of FIG. 8.
Figure 8:
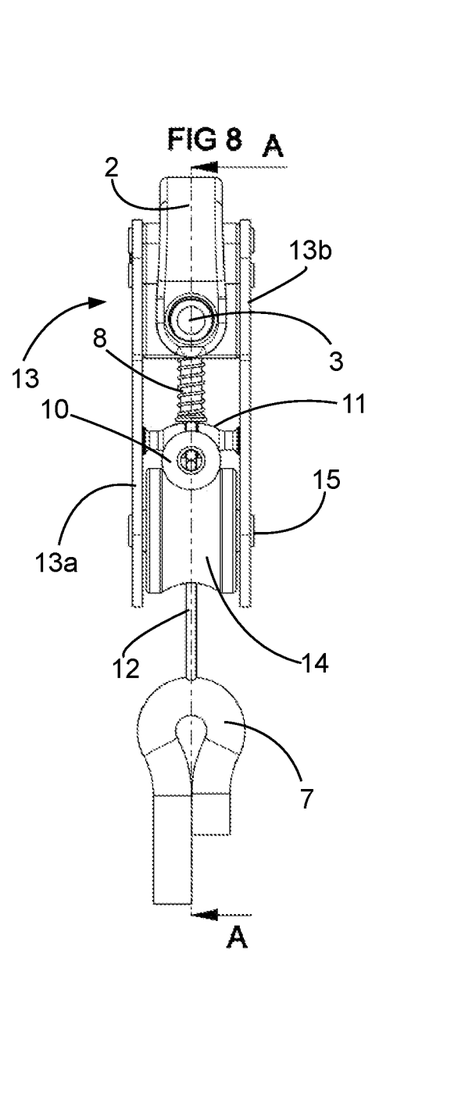
FIG. 8 illustrates a connector provided with a retrieval ball in the second ring, in schematic manner, in side view.
Figure 9:
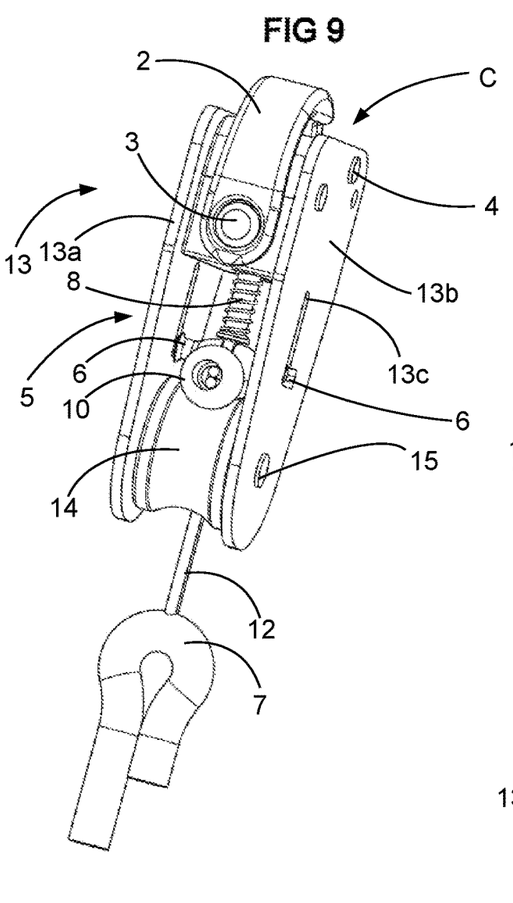
FIG. 9 illustrates a connector provided with a retrieval ball in the second ring, in schematic manner, in profile view.

In yet another embodiment illustrated in FIGS. 6 to 12, wire part 7 is associated with a retrieval ball 10. Wire part 7 has a larger lateral dimension than the threshold distance and retrieval ball 10 has a larger lateral dimension than the threshold distance. Wire part 7 and retrieval ball 10 are separated by a second wire part 12 that has a smaller lateral dimension than the threshold distance. In this configuration, wire part 7 moves in second ring 5 until second wire part 12 reaches the sliding area as illustrated in FIGS. 4 to 6. Probe 6 reaches the threshold position with a movement along the first direction. Then retrieval ball 10 comes into contact with probe 6 and the traction applied on wire part 7 makes probe 6 move along the second direction secant to the first direction as illustrated in FIGS. 7 to 12. Movement of probe 6 causes movement of blocker 3 and opening of first ring 1. The two directions of movement of probe 6 can be defined by means of two grooves 13*c* formed in body 13 and illustrated in FIGS. 3, 6 and 9. Grooves 13*c* can be through grooves and probe 6 can open onto the outer wall of flanges 13*a* and/or 13*b* to facilitate handling of probe 6 to insert wire part 7 in the connector. The force applied on wire part 7 to extract it from the connector is applied on probe 6 which moves to the rear of the connector moving blocker 3 and opening first ring 1. The retrieval ball can be of any shape.

In another configuration, retrieval ball 10 collaborates with a part of the connector that is different from probe 6 to obtain movement of blocker 3 and opening of first ring 1. For example, the connector has a body 13 inside which second ring 5 and probe 6 are located. Retrieval ball 10 can be broader than second ring 5 so that the retrieval ball is not able to come into contact with probe 6. Retrieval ball 10 can then come and press on body 13, for example pressing on a part which is mechanically connected to blocker 3. The movement applied by retrieval ball 10 moves the part with respect to the rest of body 13 enabling blocker 3 to be moved so as to open first ring 1.

In a particular configuration, probe 6 and blocker 3 form a part in a single piece. To move blocker 3, once the threshold position has been reached, it is advantageous to provide for movement of probe 6 to be a translation and for translation of probe 6 to result in translation of blocker 3, as is illustrated. The probe is then able to have two consecutive movements one only of which makes blocker 3 move. In an alternative embodiment, movement of probe 6 is a rotation which is associated with a rotation of blocker 3. Probe 6 and blocker 3 are fitted for example on a rotation spindle.

It is advantageous to have two successive actions to achieve unlocking of blocker 3 followed by opening of the first ring thereby enhancing safety. It is also advantageous to use an action of the rope to open the first ring as the rope is still connected to the connector. This solution is preferable to the use of a different rope for opening the ring.

In a particular embodiment illustrated in FIGS. 1 to 12, second ring 5 has a sliding area formed by a pulley. In this way, the wire part can slide in second ring 5 without friction.

The connector can be formed by a body having two opposite flanges. The two opposite flanges form a part of second ring 5. One or both of the flanges advantageously defines one or more grooves inside which probe 6 moves.

The sliding area can be formed by a pulley 14 fitted rotating with respect to a rotation spindle 15 perpendicular to at least one of the flanges. Pulley 14 is fitted between the two flanges. Probe 6 is fitted between the two flanges 13a, 13b of body 13. When rod 2 is mounted rotating, it is preferable to provide for rotation spindle 4 to be mounted secant to the two flanges 13a and 13b. Rotation spindle 4 is advantageously fixed to the two flanges 13a and 13b.

The two flanges 13 a and 13b are advantageously parallel to one another.

When a spring 8 is used to move probe 6 to the sliding area, it is preferable to fix one end of spring 8 to body 13.

Figure 13:
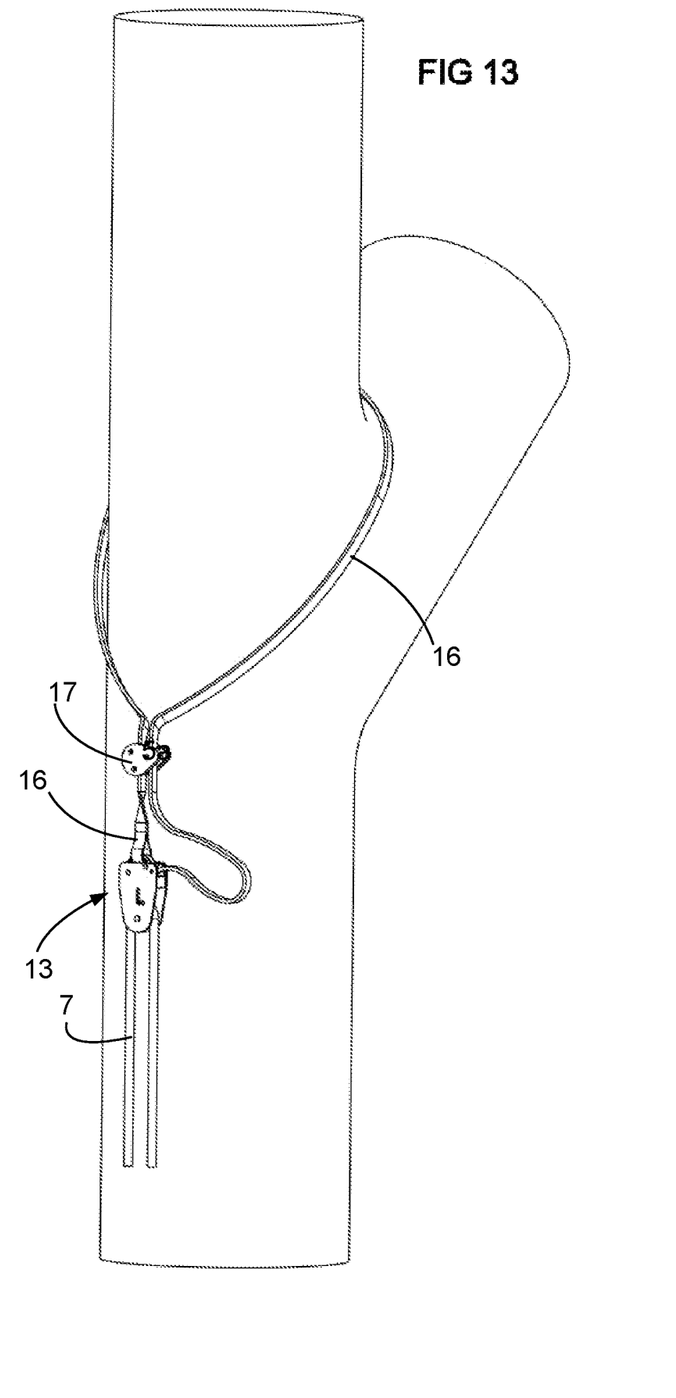
FIG. 13 schematically illustrates a hoisting device for hoisting a rope with a cambium saver provided with a connector.

It is advantageous to form a cambium saver that comprises a connector according to one of the different foregoing embodiments. The connector is associated with an additional wire part 16, for example a strap or a rope. Additional wire part 16 passes round a branch or the trunk of a tree to define an anchor point. In preferential manner, one of the ends of additional wire part 16 is mounted fixedly on the connector whereas the other end is fixed to openable first ring 1. In this way, once first ring 1 has opened, additional wire part 16 still remains fixed to the connector. It is also possible to provide for both ends of the loop defined by additional wire part 16 to be fixed in first ring 1, but this embodiment is less advantageous as additional wire part 16 can more easily remain stuck in the tree. In a particular embodiment, the cambium saver comprises a blocking device 17 of additional wire part 16 configured to define the length of the loop passing around the tree trunk or branch.

In advantageous manner, the blocking device comprises a body that defines two through grooves for a strand of additional wire part 12 to pass. In advantageous manner, at least one of the grooves is not straight so as to impose a friction on additional wire part 16 and define the length of the loop. Blocking device 17 prevents additional wire part 16 from clamping the branch or the trunk of the tree. This in particular enables the position of the connector to be adjusted with respect to the branches and the trunk thereby enabling the connector to be better placed to reduce friction.

It is advantageous to form a hoisting device for hoisting a wire part that comprises a cambium saver such as the one described in the foregoing in association with a wire part passing through second ring 5 of the connector. It is particularly advantageous to provide for wire part 7 to be associated with a retrieval ball 10.

Operation of the connector can be presented in the following manner. A connector according to one of the foregoing embodiments is provided. A wire part 7 is present in second ring 5. First ring 1 is closed. Wire part 7 has a larger lateral dimension than the threshold position of probe 6 so that blocker 3 prevents opening of first ring 1.

The wire part slides in second ring 5 until probe 6 reaches the threshold position. It is then possible to move blocker 3 from the first position to the second position. Blocker 3 is moved to allow first ring 1 to open. Opening of first ring 1 can be automatic or be caused by the weight of the connector or by the force exerted by the wire part.

In advantageous manner, the wire part slides until retrieval ball 10 makes probe 6 move thereby making blocker 3 move to open first ring 1. It is particularly advantageous to provide for probe 6 to be involved in blocking of first ring 1 and then in movement of blocker 3 to open first ring 1. The same part is thus used for two different actions which makes the connector easier to produce by limiting the number of parts used to perform blocking and releasing of first ring 1. To enhance the safety of use, it is particularly advantageous to use the embodiment in which probe 6 follows two consecutive secant movements to leave a position in which blocker 3 remains in a blocking position and move to a position where blocker 3 is able to move and movement of probe 6 results in movement of blocker 3.

In the foregoing embodiments, the connector is used for performing tree care. Other applications are however possible where it is necessary to have a connector that is openable in remote manner. The connector can be used to form a remotely releasable anchor point, for example in caving, canyoning or in other professional activities.

The invention claimed is:

1. A connector comprising:
    an arm mounted movable with respect to a body, the arm and the body delineating a first ring fitted openable and a blocker collaborating with the arm, the arm being fitted movable between a first position of the arm where the first ring is closed and a second position of the arm where the first ring is open, the blocker being fitted movable between a first position of the blocker collaborating with the arm in the first position of the arm to keep the first ring closed and a second position of the blocker allowing opening of the first ring;
    a through-hole defined by the body, the through hole being distinct from the first ring and designed to receive a wire part passing through the through-hole and arranged sliding on a sliding area, the wire part being designed to support a climber in operation;
    a probe arranged movable in the through hole, the probe being fitted movable with respect to the sliding area to measure a thickness of the wire part running between the sliding area and the probe and compare the thickness of the wire part to a threshold value, the probe being operatively connected to the blocker;
    wherein when the probe is separated from the sliding area by a distance greater than the threshold value, the blocker cannot move from the first position so as to keep the first ring closed; and wherein the blocker is able to move from the first position to the second position only when the probe is separated from the sliding area by a distance lower than the threshold value.

2. The connector according to claim 1, wherein the probe comprises a rotative part mounted rotative around a spindle and designed to contact the wire part and wherein the spindle is fitted movable in a first groove allowing rotation of the rotative part or in a second groove preventing rotation of the rotative part, rotation of the rotative part being blocked when the threshold value is achieved.

3. The connector according to claim 1, wherein the arm is movable in rotation between the first position of the arm and the second position of the warm.

4. The connector according to claim 1, wherein the probe is only movable in translation in a first direction when the measured thickness is greater than the threshold value and the probe is movable in translation in a second direction secant to the first direction when the measured thickness is lower than the threshold value, the blocker being in the first position when the measured thickness is greater than the threshold value and wherein translation of the probe in the second direction results in movement of the blocker between the first and the second positions of the blocker.

5. The connector according to claim 1 wherein the sliding area is formed by a pulley and wherein the probe is fitted movable in translation between the first position and the second position.

6. The connector according to claim 1, comprising an additional wire part having a first end fixed to the body provided with the openable first ring and the distinct through hole, the additional wire part having a second end fixed to the openable first ring.

7. A cambium saver comprising a connector according claim 6 and a blocking device of two strands of the additional wire part to define a ring of an additional wire part.

8. A hoisting device for hoisting on a wire part comprising a cambium saver according to claim 7 and a wire part associated with a retrieval ball, the wire part passing through the through-hole, the wire part having a larger lateral dimension than the threshold value, the retrieval ball having a larger lateral dimension than the threshold value and the retrieval ball being separated from the wire part by a second wire part having a smaller lateral dimension than the threshold value, the wire part being designed to support a climber during operations.

9. A method for using a hoisting device for hoisting a wire part comprising the following steps:
   providing a hoisting device for hoisting a wire part according to claim 8;
   moving the wire part in the through-hole so that the probe leaves the wire part and moves to the second wire part and that the blocker allows opening of the openable first ring.

10. The method for using a hoisting device on a wire part according to claim 8, wherein the wire part collaborates with a retrieval ball and wherein a force applied on the wire part to extract the wire part from the connector results in the retrieval ball coming into contact with the probe and in movement of the probe to the rear of the connector to open the first ring.

* * * * *